United States Patent [19]

Carr

[11] Patent Number: 4,503,399
[45] Date of Patent: Mar. 5, 1985

[54] ELECTRONIC CATTLE GUARD

[75] Inventor: Jay R. Carr, Pierre, S. Dak.

[73] Assignee: Keith A. Tidball, Pierre, S. Dak. ; a part interest

[21] Appl. No.: 455,894

[22] Filed: Jan. 5, 1983

[51] Int. Cl.³ .................. A01K 3/00; G08B 21/00; G08B 13/18
[52] U.S. Cl. .................. 340/573; 116/22 A; 119/29; 340/556
[58] Field of Search .................. 340/573, 556; 119/15, 119/15.5 R, 96, 29, 1; 116/22 A

[56] References Cited
U.S. PATENT DOCUMENTS
3,753,421 8/1973 Peck ...................................... 119/29

Primary Examiner—Glen R. Swann, III
Attorney, Agent, or Firm—Harvey B. Jacobson; Clarence A. O'Brien

[57] ABSTRACT

Livestock entering a border zone along a vehicle roadway are deterred by sequentially activated horn, smoke generating and odor emitting devices triggered in response to interruption of one photo-electric beam at that end of the zone from which the cattle enter. Travel of a vehicle through the zone sequentially interrupts the two beams at opposite ends of the zone to reset the deterring apparatus and cancel its operation.

11 Claims, 4 Drawing Figures

ELECTRONIC CATTLE GUARD

BACKGROUND OF THE INVENTION

This invention relates in general to the control of livestock or cattle and more particularly to a system for deterring the crossing of a fenced border by cattle along a vehicle roadway.

The present invention involves the detection of cattle entering a border zone along a vehicle roadway. Methods of detecting entry into protected zones and monitoring movement therein by use of photo-electric light beams is generally well known. However, such systems are usually incapable of distinguishing between objects such as automotive vehicles and cattle.

It is therefore an important object of the present invention to provide a photo-electric system for detecting invasion of a predetermined zone which will distinguish between moving vehicles and slower moving cattle so as to limit operation of apparatus to its intended purpose of deterring cattle entering such zone.

An additional object is to provide a control system for cattle deterring apparatus by means of which entry of cattle into a border zone produces a graduated deterrent response to induce retreat of the cattle from the zone with minimum irritation to the cattle.

SUMMARY OF THE INVENTION

In accordance with the present invention, sequential interruption of a photo-electric beam is detected in response to invasions of a zone defined between two of such beams along a vehicle roadway. Cattle deterring apparatus including a horn, smoke generating and chemical odor emitting devices are triggered into operation in timed sequence following interruption of one beam and continued in operation until the same beam is again interrupted by retreating cattle. The interval between sequential interruption of different beams is timed to reset the deterring apparatus if the timed interval is less than a predetermined duration corresponding to travel of a vehicle through the zone above the lowest expected speed.

BRIEF DESCRIPTION OF THE DRAWINGS

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
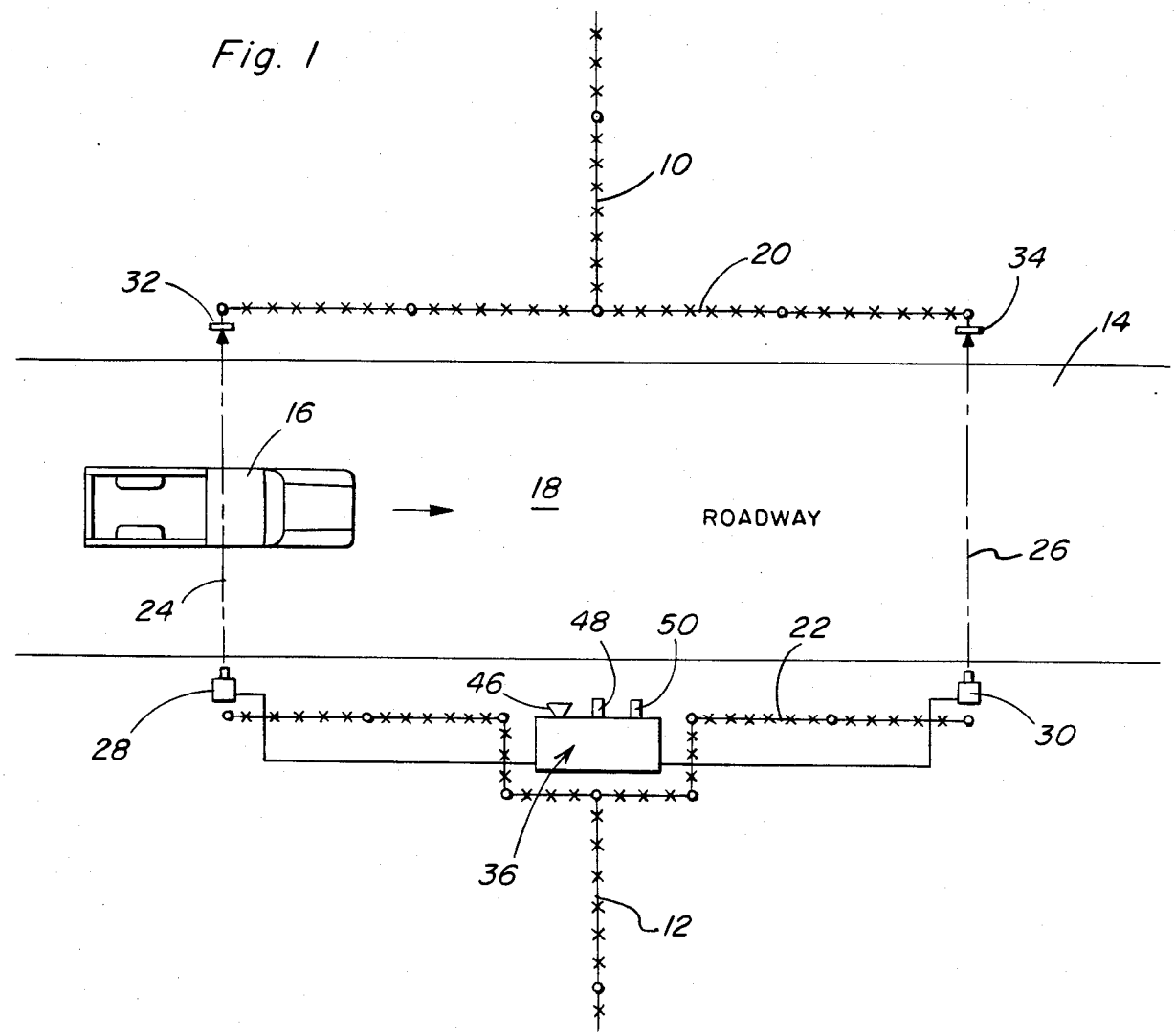
FIG. 1 is a simplified top plan view of an installational arrangement for the system of the present invention.

Referring now to the drawings in detail, FIG. 1 illustrates a typical environment for the present invention wherein a border between adjacent fields is established by sections 10 and 12 of a fence that is interrupted by an intersecting roadway 14 over which a vehicle 16 is adapted to travel. Livestock or cattle confined to one side of the fence will eventually attempt to cross the border along the roadway 14. In order to discourage such crossing of the border, a deterrent zone is established along a section of the roadway, in accordance with the present invention, between generally parallel fence sections 20 and 22 to which the border fence sections 10 and 12 are anchored. The ends of the deterrent zone are defined by beams of radiation 24 and 26, such as light emitted from photo-electric emitter-receiver units 28 and 30 of well known construction and operation. Reflectors 32 and 34 are operatively positioned as shown to reflect the beams 28 and 30 at which beam interruption is detected by sensors associated therewith. The beams are interrupted by objects moving along the roadway such as the vehicle 16 or by cattle attempting to cross the border.

Deterrent establishing apparatus generally referred to by reference numeral 36 in FIG. 1 is provided at a suitable location as shown to create conditions within zone 18 that will deter movement of livestock therethrough. The apparatus 36 will include electronic controls wired to the units 28 and 30.

Figure 2:
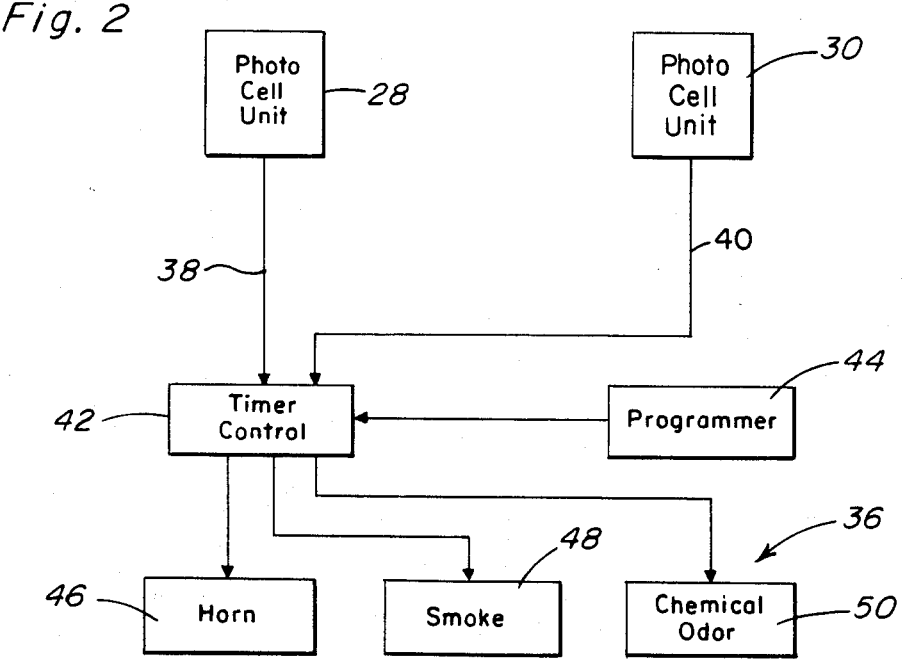
FIG. 2 is a schematic block diagram of the system.
Figure 3:
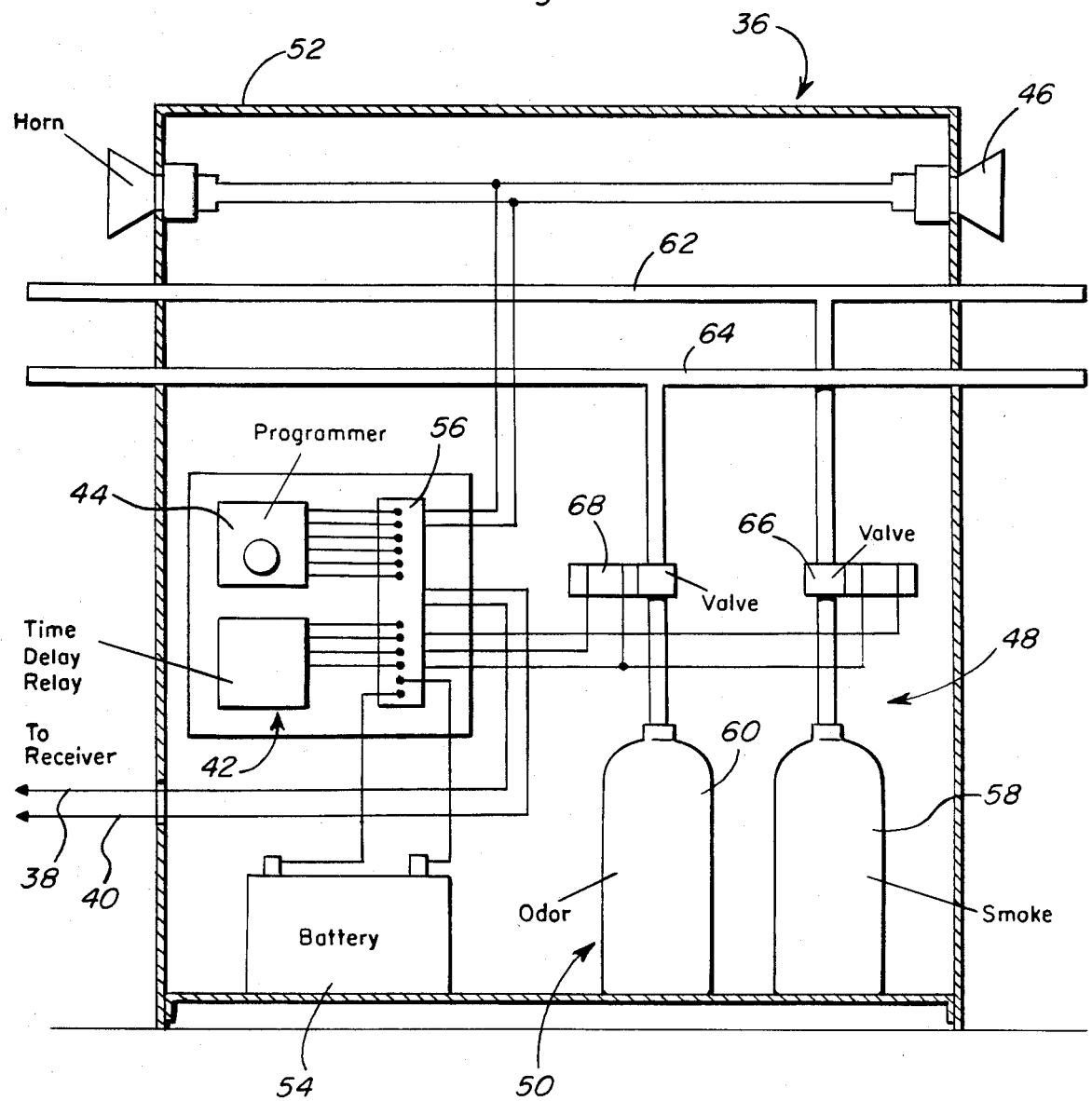
FIG. 3 is a section view through apparatus utilized in the system.

As shown in FIG. 2, the units 28 and 30 are connected by signal lines 38 and 40 to a time delay control 42, the operation of which is dictated by a programmer 44 to activate a horn 46, a smoke generator 48 and a chemical odor emitting device 50 of the apparatus 36. The devices 46, 48 and 50 will accordingly produce deterring effects of increasing severity by respectively irritating the hearing, visual and smelling senses of livestock. A typical arrangement of the apparatus 36 is shown in FIG. 3, housed within a cabinet 52. The horn 46 is of an electrically operated type energized from a battery source of power 54 through a terminal 56 to which the timer control 42, programmer 44 and signal lines 38 and 40 are connected. The smoke generator 48 and odor emitting device 50 respectively include storage tanks 58 and 60 from which pressurized smoke and odorous fluid are discharged through tubes 62 and 64 upon opening of solenoid valves 66 and 68 wired to terminal 56.

Figure 4:
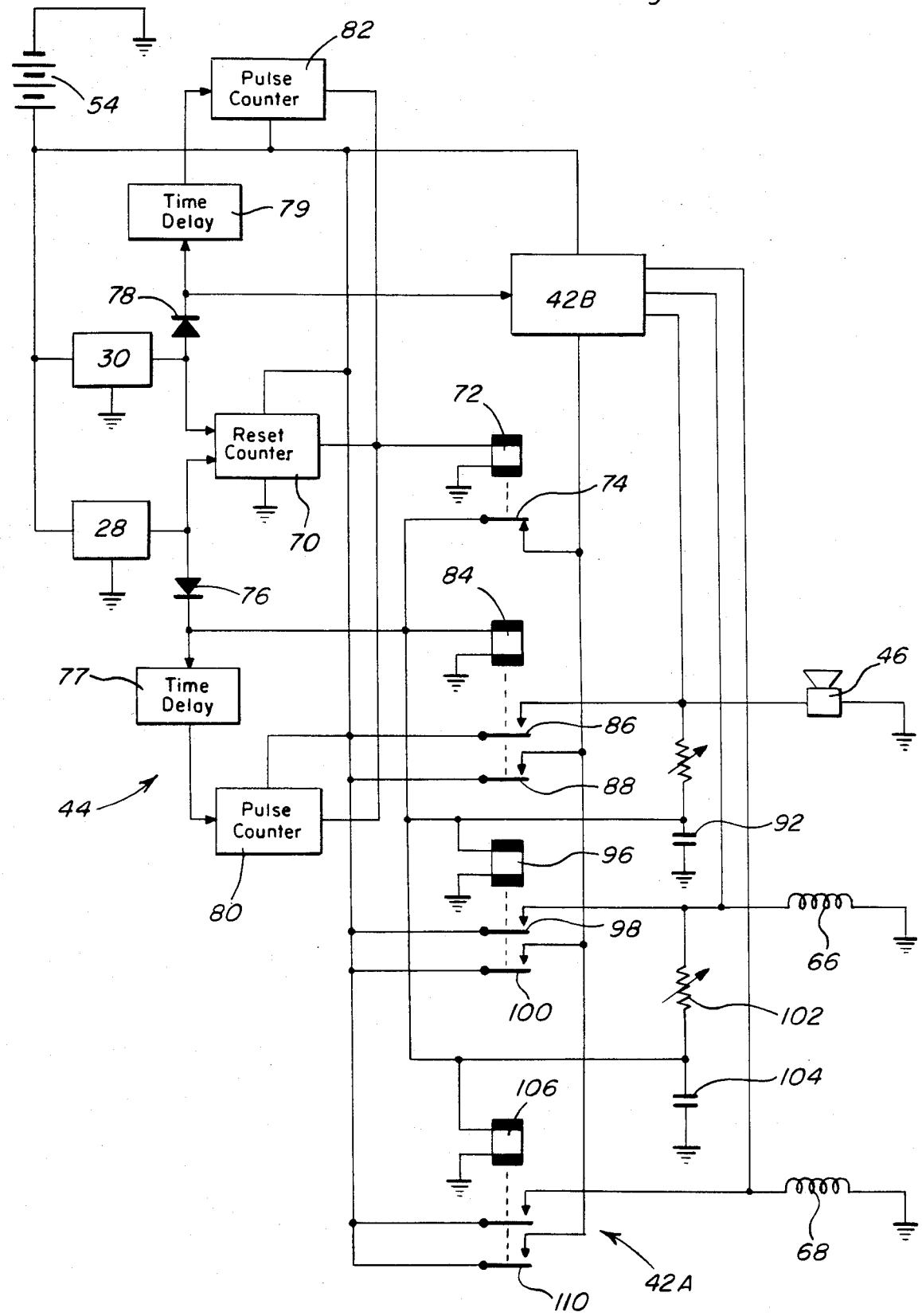
FIG. 4 is an electrical circuit diagram illustrating controls associated with the system.

FIG. 4 shows by way of example, one form of electrical circuit capable of carrying out the method of the present invention. The two photo-cell units 28 and 30 energized by the battery 54, produce output pulses when the associated beams 24 and 26 are interrupted, such pulses being fed to an electronic counter 70 in the programmer 44 through which the interval between two sequential interruptions of different beams are timed and produces an output pulse if the duration of the interval is less than a preset amount (corresponding to travel of a vehicle through zone 18 above the lowest expected speed, such as 10 MPH). The output of counter 70 is connected to relay coil 72 of a reset relay having a normally closed reset switch 74. Pulse outputs of each unit 28 and 30 are also fed by diodes 76 and 78 through time delay circuits 77 and 79 to pulse counters 80 and 82 so that each second pulse of a sequence of spaced pulses produces an output to energize reset relay coil 72. Pulsing of the reset relay is operative through relay switch 74 to cancel operation of one or more of the deterrent devices 46, 48 and 50 that are sequentially operated under control of the relay sections 42A and 42B of the control 42 respectively associated with each of the units 28 and 30.

Each of the relay sections 42A and 42B are similar in arrangement and operation. Relay section 42A, for example, includes a relay coil 84 connected by diode 76 to unit 28 so that a first pulse of a sequence produced by the first interruption of beam 24, pulses relay coil 84 to close its normally open horn switch 86 and close a relay holding switch 88. Relay switch 86 closed in response to the first interruption of beam 24, completes a circuit through the horn from battery power line 90 to energize the horn. Relay switch 88 being connected in series with normally closed reset switch 74, maintains relay coil 84 energized so as to continue operation of the horn until reset switch 74 is opened. When the horn is energized by closing of relay switch 86, a timing capacitor 92 is charged through an adjustable resistor 94 to establish a first time delay period at the end of which relay coil 96 is energized to close its normally open relay switches 98 and 100. Relay switch 98 when closed energizes the solenoid valve 66 to operate the smoke generator while closing of relay switch 100 maintains relay coil 96 energized to continue operation of the smoke generator. However, the occurrence of a second interruption of beam 24 before the end of the first time delay period deenergizes relay coil 84 by pulsing of relay coil 72 from counter 80 to open the reset switch 72. Thus, interruption of two different beams by a vehicle traveling through zone 18 cancels operation of the deterrent devices, whereas the interruption of one beam by slower moving cattle initiates and continues operation of the horn until the same beam is interrupted the second time as the cattle retreat from the zone 18. If the cattle do not retreat, after elapse of the first time delay period, the smoke generator is triggered into operation and continues in operation until the elapse of a second time delay period following energization of the solenoid valve 66 of the smoke generator.

The second time delay period is determined by the setting of a second adjustable resistor 102 through which a second timing capacitor 104 is charged to a level sufficient to energize relay coil 106 at the end of the second time delay period. Energization of relay coil 106 closes its relay switch 108 to energize the solenoid valve 68 and closes the relay holding switch 110 connected in series with reset switch 74 between the voltage line 90 and relay coil 106. Thus, the odor emitting device 50 is then operated until reset caused by a second interruption of the same beam.

In order to distinguish between retreating cattle and following cattle entering the detterent zone to cause a second interruption of the same beam, time delay 77 or 79 cancels transmittal of a second pulse if it occurs within a delay interval of two seconds, for example, found to be suitable since it will not interfere with the reset effect of a moving vehicle which causes pulsing of relay coil 72 by counter 70. Such delay action on the second cancelling pulse to counter 80 and 82 will prevent unintended cancellation of the deterring action.

In most cases, the first deterrent produced by horn 46 is sufficient. However, the two additional deterrents provided by smoke generator 48 and odor emitting device 50 are available and are automatically triggered into operation in sequence as a graduated response to any hesitation on the part of cattle to retreat from zone 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a method of discouraging movement of livestock along a vehicle roadway, the steps of: establishing a beam of radiation across said roadway; detecting interruptions of said beam; and generating a deterrent effect in response to elapse of a predetermined delay period following detection of a first of said interruptions.

2. The method of claim 1 including the step of: maintaining the deterrent effect until detection of a second of the interruptions.

3. The method of claim 2 including the steps of: establishing a second beam of radiation across the roadway to define a deterrent zone between the first mentioned beam and the second beam; detecting interruptions of the second beam; timing the interval between sequential interruptions of the first and second beams; and cancelling the deterrent effect upon elapse of timed intervals of less than a predetermined duration.

4. The method of claim 3 including the step of: cancelling the deterrent effect upon detection of the second of said interruptions; and preventing said cancellation if said second of the interruptions occurs within a predetermined delay interval following the first of the interruptions.

5. A method of discouraging movement of livestock along a vehicle roadway, including the steps of: establishing at least two beams of radiation across said roadway to define a deterrent zone; detecting sequential interruptions of said beams; generating a deterrent effect within said zone between the sequential interruptions of the same beam; timing the interval between sequential interruptions of different beams; and cancelling the deterrent effect in response to timed intervals of less than a predetermined duration.

6. The method of claim 5 including the steps of: generating additional deterrent effects upon elapse of predetermined delay periods between said sequential interruptions of the same beam.

7. In combination with apparatus for deterring movement of livestock across a border along a vehicle roadway, a method including the steps of: establishing at least two beams of radiation across the roadway on opposite sides of the border; initiating operation of the deterring apparatus when one of the beams is interrupted; continuing operation of the apparatus until said one of the beams is interrupted again; timing the intervals between sequential interruptions of different beams; and cancelling said operation of the apparatus in response to timed intervals of less than a predetermined duration.

8. The method of claim 7 wherein the operation of said deterring apparatus includes the steps of: sequentially generating irritants to hearing, visual and smelling senses within the deterrent zone.

9. A system for deterring movement of livestock or the like along a vehicle roadway, including means for establishing at least two beams of radiation across said roadway to define a deterrent zone, means for detecting interruptions of said beams; means responsive to detection of a first interruption of one of the beams for establishing deterrent effects within said zone, time delay means connected to the deterrent establishing means for maintaining operation thereof until detection of a second interruption of said one of the beams, programming means connected to said detecting means for timing intervals between sequential interruptions of the beams, and reset means connected to the programming means for cancelling said operation of the deterrent establishing means in response to timed intervals less than a predetermined duration between the interruptions of different beams.

10. The system of claim 9 wherein said deterrent establishing means include sequentially activated horn, smoke generating and odor emitting devices.

11. The system of claim 9 including signal delay means for maintaining operation of the deterrent establishing means when the second interruption of said one of the beams occurs within a delay interval of preset duration.

* * * * *